Feb. 5, 1935.   P. LEMAIGRE   1,990,410
SPRING MOUNTING
Filed Sept. 13, 1929
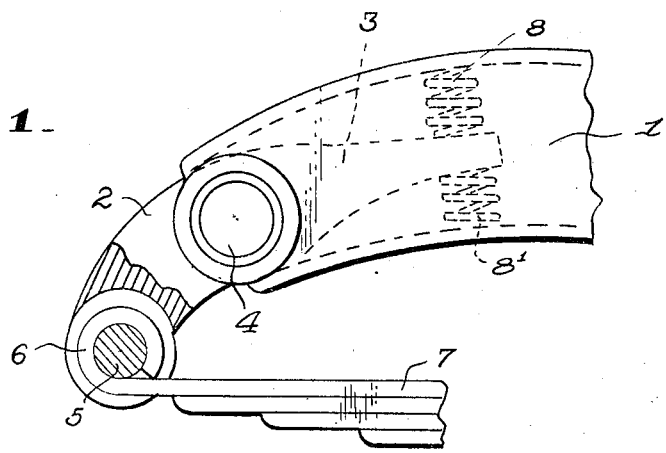
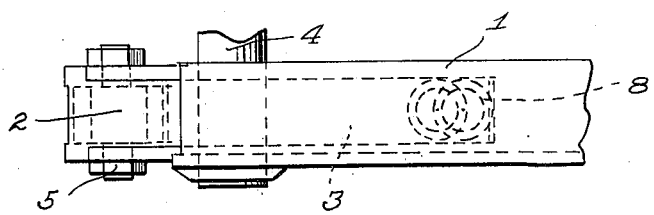
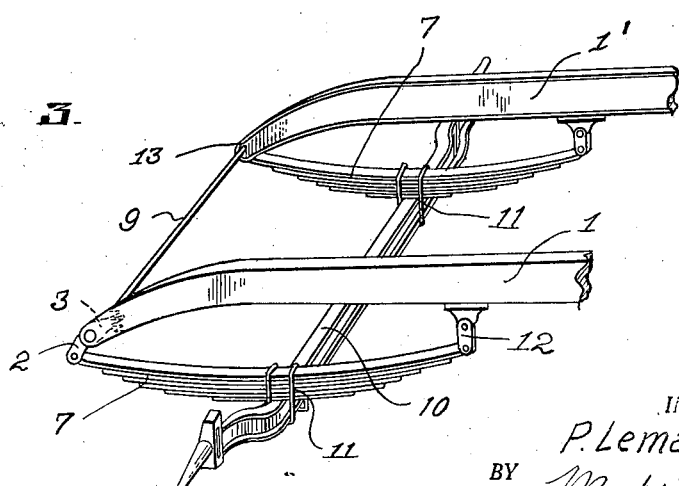
INVENTOR.
P. Lemaigre
BY Marks & Clerk
ATTORNEYS.

Patented Feb. 5, 1935

1,990,410

UNITED STATES PATENT OFFICE 1,990,410

SPRING MOUNTING

Pierre Lemaigre, St. Denis, France, assignor, by mesne assignments, to Milton Tibbetts, Detroit, Mich., trustee Application September 13, 1929, Serial No. 392,448
In France October 16, 1928

6 Claims. (Cl. 267—17)

This invention relates to motor vehicles and particularly to the means for supporting the frame on the axle. It is more especially adapted to the steering or front axle of the vehicle and will be so described.

Since the introduction some years ago of so-called balloon or semi-balloon tires on motor vehicles more or less difficulty has been encountered with unsteadiness of the parts of the vehicle supported by the steering or front axle. This unsteadiness results in what is termed "shimmy" and there is sometimes a serious kick-back through the steering gear that is more or less dangerous. Much has been done recently towards the elimination of this difficulty and one of the objects of the present invention is to so connect the springs to the frame of the vehicle that the kick-back through the steering will be less noticeable or perhaps eliminated.

Another object of the invention is to provide a practical form of shackle connection between the supporting spring and the vehicle frame which, combined with the other connections of the parts, will be reduced or will eliminate this shimmy or kick-back.

Other objects of the invention will appear from the following description taken in connection with the drawing, which forms a part of this specification, and in which:

Fig. 1 is a side elevation, with parts broken away, illustrating the spring shackle or bracket of the invention as applied to one of the side members of the vehicle frame;

Fig. 2 is a plan view of the construction shown in Fig. 1, and

Fig. 3 is a perspective view illustrating the forward end of a left hand drive motor vehicle chassis with the spring shackle and associated parts of this invention illustrated.

Referring to the drawing, 1, 1' indicate the two side members of a motor vehicle frame and 10 is the front or steering axle. Arranged longitudinally of the frame members are two supporting springs 7, each of which is suitably connected to the axle as at 11. The rear end of each spring is shackled to a suitable bracket on the frame as indicated at 12.

At the forward end of the frame members there is a cross bar or rod 9 connecting the two side members of the frame. The forward end of one of the supporting springs is preferably pivotally connected to the forward end of the side member. As shown, the right hand spring member 7 is so connected as at 13. Thus the right hand side member is spring supported on the axle in the usual or normal manner.

The left hand spring 7, however, is connected to the side frame member 1 by a bracket or spring shackle 2 and this spring shackle is so mounted that it is yieldingly retained against movement on its pivot, thus normally acting as a substantially rigid bracket for the front end of the spring 7, or abnormally or when subjected to shock, acting to give slightly so that the spring 7 may move lengthwise to a limited extent to thereby relieve against the axle shocks being carried to the frame. This slight yielding movement of the supporting spring relative to the frame has also been found to greatly relieve or eliminate against the shimmy action which would otherwise be produced under some conditions.

The bracket or shackle 2 referred to above is pivotally connected at one of its ends to the spring eye 6 at the front end of the spring 7, as at 5, and intermediate its ends the shackle 2 is pivotally connected to the front end of the frame member 1, as at 4. This portion of the shackle, with the spring eye arranged lower than the pivotal connection 4, is in compression, as distinguished from a spring shackle in suspension, as some are arranged. Thus there is no tendency on the part of the shackle itself to maintain its neutral or normal position as is the case in a suspension shackle.

The shackle or bracket 2 is formed with an extension 3 which projects in the general longitudinal line of the shackle into the space between the flanges of the channel-shaped frame member 1, and this extension 3 is arranged between rather heavy coil springs 8, 8' which abut against the channels of said frame member. It is these springs 8, 8' which maintain the shackle 2 against movement on its pivot in either direction. In other words, these springs maintain the shackle in a substantially neutral position and prevent an appreciable movement of the shackle.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of the frame side member, a supporting spring extending lengthwise of the side member, a shackle pivotally connected to one end of the spring and pivotally connected at its other end to the frame, a second shackle pivotally connected to the other end of the spring and pivotally connected to the frame, said second shackle having an extension from one end in the general direction of its length, and springs on both sides of said extension and abutting against portions of the frame for yieldingly retaining said second shackle in substantially intermediate position.

2. In a motor vehicle, the combination of a side frame member, a supporting spring member, a rigid bracket pivoted to the frame member and following the general longitudinal line of the frame member, a pivotal connection between said bracket and the end of said supporting spring, and springs on both sides of said bracket and abutting against a portion of the frame member, for yieldingly retaining the bracket against movement in either direction on its pivot.

3. In a motor vehicle, the combination of a frame member of channel cross section, a supporting spring member, a shackle pivotally connected at the end of said frame member and to the end of said spring member, said shackle having an extension projecting into the channel of the frame member, and springs between said extension and the flanges of the frame member for yieldingly retaining the spring shackle against movement in either direction.

4. In a motor vehicle, a frame side member, a supporting spring extending lengthwise of said member, a shackle connecting the rear end of the spring with the side member, a lever pivoted intermediate its ends to the front end of the side member, neutralizing springs interposed between the side member and one end of said lever, and a pivotal connection between the opposite end of said lever and the front end of the supporting spring.

5. In a motor vehicle, a frame side member, a supporting spring member extending lengthwise of the frame member, a rigid lever pivotally connecting said members at one end of the spring, and neutralizing springs interposed between and directly engaging both said lever and one of said members, said springs being vertically removed from the space between the supporting spring member and the frame member to afford freedom of movement thereof.

6. In a motor vehicle, the combination of the frame side member, a supporting spring extending lengthwise of the side member, a shackle pivotally connected to one end of the spring and pivotally connected at its other end to the frame, said shackle having its movement unrestrained other than through said supporting spring, a second shackle pivotally connected to the other end of the spring and pivotally connected to the frame, the latter connection being substantially above the former connection so that the shackle is normally in compression, said second shackle having an extension, and springs on both sides of and bearing directly at one end against said extension, the other ends of said springs being retained by said frame member, whereby said second shackle will give slightly so that said supporting spring may move lengthwise to a limited extent to thereby relieve against axle shocks being carried to the frame.

PIERRE LEMAIGRE.